United States Patent
Yang et al.

(10) Patent No.: US 8,576,714 B2
(45) Date of Patent: Nov. 5, 2013

(54) SYSTEM AND METHOD FOR RELAY NODE FLOW CONTROL IN A WIRELESS COMMUNICATIONS SYSTEM

(75) Inventors: Yunsong Yang, San Diego, CA (US);
Weimin Xiao, Hoffman Estates, IL (US);
Pengfei Xia, San Diego, CA (US);
Jianmin Lu, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 227 days.

(21) Appl. No.: 12/784,352

(22) Filed: May 20, 2010

(65) Prior Publication Data

US 2010/0302946 A1 Dec. 2, 2010

Related U.S. Application Data (60) Provisional application No. 61/182,360, filed on May 29, 2009.

(51) Int. Cl.
*G01R 31/08* (2006.01)

(52) U.S. Cl.
USPC .......................................................... 370/235

(58) Field of Classification Search
USPC ......... 370/203, 204–215, 229–240, 310–337, 370/338–350, 395.1, 395.3, 395.4, 395.41, 370/395.42, 395.5, 395.52, 395.53, 370/412–421, 431–457, 458–463, 464–497, 370/498–522, 523–520, 521–529
See application file for complete search history.

(56) References Cited

U.S. PATENT DOCUMENTS

| | | | | |
|---|---|---|---|---|
| 6,167,030 A | * | 12/2000 | Kilkki et al. | 370/236 |
| 2002/0068588 A1 | | 6/2002 | Yoshida et al. | |
| 2002/0160784 A1 | * | 10/2002 | Kuwahara et al. | 455/452 |
| 2003/0214928 A1 | * | 11/2003 | Chuah | 370/336 |
| 2006/0104370 A1 | * | 5/2006 | Yamanaka et al. | 375/242 |
| 2007/0264932 A1 | | 11/2007 | Suh et al. | |
| 2008/0101406 A1 | * | 5/2008 | Matoba | 370/468 |
| 2009/0207730 A1 | * | 8/2009 | Stamoulis et al. | 370/230.1 |
| 2009/0207777 A1 | * | 8/2009 | Stamoulis et al. | 370/315 |
| 2009/0209262 A1 | * | 8/2009 | Stamoulis et al. | 455/450 |
| 2010/0135166 A1 | * | 6/2010 | Ahluwalia | 370/252 |
| 2010/0165846 A1 | | 7/2010 | Yamaguchi et al. | |
| 2011/0170513 A1 | * | 7/2011 | Seo et al. | 370/329 |

FOREIGN PATENT DOCUMENTS

| | | |
|---|---|---|
| CN | 101389113 A | 3/2009 |
| CN | 101438541 A | 5/2009 |
| JP | 2002171572 A | 6/2002 |
| JP | 2002330166 A | 11/2002 |

(Continued)

OTHER PUBLICATIONS

Braden, B., et al., "Recommendations on Queue Management and Congestion Avoidance in the Internet," Network Working Group, RFC 2309, Apr. 1998, 17 pages.

(Continued)

*Primary Examiner* — Jung-Jen Liu
(74) *Attorney, Agent, or Firm* — Slater & Matsil, L.L.P.

(57) ABSTRACT

A system and method for relay node flow control and/or congestion control in a wireless communications system are provided. A method for relay operation includes determining a buffer status of a buffer for data to be transmitted on a communications channel allocated from network resources controlled by a communications controller, computing buffer status information based on the buffer status, and transmitting the buffer status information to the communications controller.

18 Claims, 3 Drawing Sheets

(56) References Cited

FOREIGN PATENT DOCUMENTS

| | | |
|---|---|---|
| JP | 2006033465 A | 2/2006 |
| JP | 4105221 B2 | 6/2008 |
| JP | 2010081438 A | 4/2010 |
| WO | WO 2004/091155 A1 | 10/2004 |
| WO | WO/2009/150853 A1 | 12/2009 |

OTHER PUBLICATIONS

Ramakrishnan, K., et al., "The Addition of Explicit Congestion Notification (ECN) to IP," Network Working Group, RFC 3168, Sep. 2001, 63 pages.

3$^{rd}$ Generation Partnership Project, "Technical Specification Group Radio Access Network; Further Advancements for E-UTRA Physical Layer Aspects (Release 9)," 3GPP TR 36.814 v1.0.1, Mar. 2009, 36 pages.

International Search Report and Written Opinion received in Patent Cooporation Treaty Application No. PCT/CN2010/073349, mailed Sep. 2, 2010, 11 pages.

European Search Report received in European Patent Application 10780076.5, mailed Jun. 5, 2012, 8 pages.

LG Electronics, "Hybrid of AF and DF in Layer-2 Relay," R1-084205, 3GPP TSG RAN WG1 Meeting #55, Prague, Czech Republic, Nov. 10-14, 2008, 4 pages.

Japanese Office Action received in Japanese Patent Application No. 2012-512191, mailed Feb. 5, 2013, 5 pages.

Chinese Office Action for Chinese Patent Application No. 2012-512191, mailed Feb. 5, 2013, 5 pages.

* cited by examiner

SYSTEM AND METHOD FOR RELAY NODE FLOW CONTROL IN A WIRELESS COMMUNICATIONS SYSTEM

This application claims the benefit of U.S. Provisional Application No. 61/182,360, filed on May 29, 2009, entitled "System and Method for Relay Node Flow Control in a Wireless Communications System," which application is hereby incorporated herein by reference.

TECHNICAL FIELD

The present invention relates generally to wireless communications, and more particularly to a system and method for relay node flow control and/or congestion control in a wireless communications system.

BACKGROUND

A Relay Node (RN) is considered for Long Term Evolution—Advanced (LTE-A) as a tool to improve, e.g., the coverage of high data rates, group mobility, temporary network deployment, the cell-edge throughput and/or to provide coverage in new areas. The RN is wirelessly connected to a wireless communications network via a donor cell (also referred to as a donor enhanced Node B (donor eNB)). The RN may serve as an eNB to one or more User Equipment (UE). To UE that is being served by the RN, the RN may appear identical to an eNB, scheduling uplink (UL) and downlink (DL) transmissions to the UE over an access link, which is between the RN and the UE.

The donor eNB may allocate a portion of its wireless resource (both UL and DL) to the RN so that the RN may service UEs. The wireless resource may comprise of resources in time, frequency, code, or space domain, or a combination thereof. The wireless resource given to the RN may be referred to as a Relay Link (RL) and may be allocated by the donor eNB in a dynamic manner by treating the RN as a UE and assigning transmission opportunities based on requests from the RN, in a persistent or semi-persistent manner by reserving an amount of wireless resource for the RL, or in a combination of both a dynamic and persistent (or semi-persistent manner).

On the DL, the RN receives and buffers DL data intended for UEs being served by the RN from the donor eNB over the RL. The RN may further perform multi-user diversity scheduling to prioritize the transmissions of the data to the intended UEs over the access link, based on channel conditions being experienced by each UE over the access link, as well as based on other criteria, such as Quality of Service (QoS) and fairness. To help ensure the effectiveness of multi-user diversity scheduling, the RN needs to buffer enough DL data for each of a significant number of UEs that it is serving. On the other hand, it is also desirable to minimize the amount of buffer memory required at the RN to reduce cost, power consumption, and physical size of the RN.

On the UL, the RN receives and buffers UL data from UEs that it is serving and then forwards the UL data to the donor eNB over the RL. Again, the RN may desire to use multi-user diversity scheduling. However, in the UL case, the multi-user diversity scheduling occurs over the access link between the UEs and the RN. If a UL buffer for a UE at the RN becomes full, the RN may simply stop scheduling UL transmissions from the UE, resulting in a smaller pool of UEs for the RN to perform multi-user diversity scheduling.

In both the DL and the UL, congestion occurs when the buffers become full. For example, in the DL, a full buffer may lead to loss of data and/or wasted RL wireless resource, while in the UL, a full buffer may negatively impact the RN's ability to fully exploit multi-user diversity scheduling.

Therefore, there is a need for a congestion avoidance mechanism to prevent the donor eNB from sending more DL data to a congested RN in order to prevent loss of data and/or wasting valuable wireless resource as well as to enable the RN's ability to exploit multi-user diversity scheduling of transmissions from the UEs.

SUMMARY OF THE INVENTION

These and other problems are generally solved or circumvented, and technical advantages are generally achieved, by embodiments of a system and method for relay node flow control and/or congestion control in a wireless communications system.

In accordance with an embodiment, a method for operating a relay in a communication system is provided. The method includes determining a buffer status of a buffer for data to be transmitted on a communications channel allocated from network resources controlled by a communications controller, determining a consumption rate or a filling rate for the buffer, determining buffer status information based on the buffer status and either the consumption rate or the filling rate for the buffer, and transmitting the buffer status information to the communications controller.

In accordance with another embodiment, a method for controller operation is provided. The method includes receiving, from a relay device, buffer status information for a buffer at the relay device, and adjusting a network resources allocation for a communications channel associated with the buffer based on the buffer status information. The buffer status information includes a buffer status of at least one uplink buffer and at least one downlink buffer at the relay device, and the communications channel is allocated from network resources controlled by the controller.

In accordance with another embodiment, a relay is provided. The relay includes a receiver, a transmitter, uplink buffers coupled to the receiver and to the transmitter, downlink buffers coupled to the receiver and to the transmitter, and a controller coupled to the uplink buffers, to the downlink buffers, to the transmitter, and to the receiver. The receiver receives signals detected by the receive antenna, and the transmitter transmits signals with the transmit antenna. The uplink buffers stores data for uplink communications channels allocated from network resources controlled by a communications controller, and the downlink buffers stores data for downlink communications channels allocated from the network resources controlled by the communications controller. The controller determines a buffer status for the uplink buffers and the downlink buffers, computes buffer status information from the buffer status, and transmits the buffer information to the communications controller.

An advantage of an embodiment is that network resources donated to a relay for relay operation may be adjusted using buffer status information and channel information to optimize data throughput, network resource utilization, multi-user diversity scheduling, and so forth.

A further advantage of an embodiment is that channel information from communications devices remote to a donor device may be used to adjust a network resource allocation made by the donor device, therefore, the network resource allocation may be made based on the communications devices' ability to produce and/or consume information.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
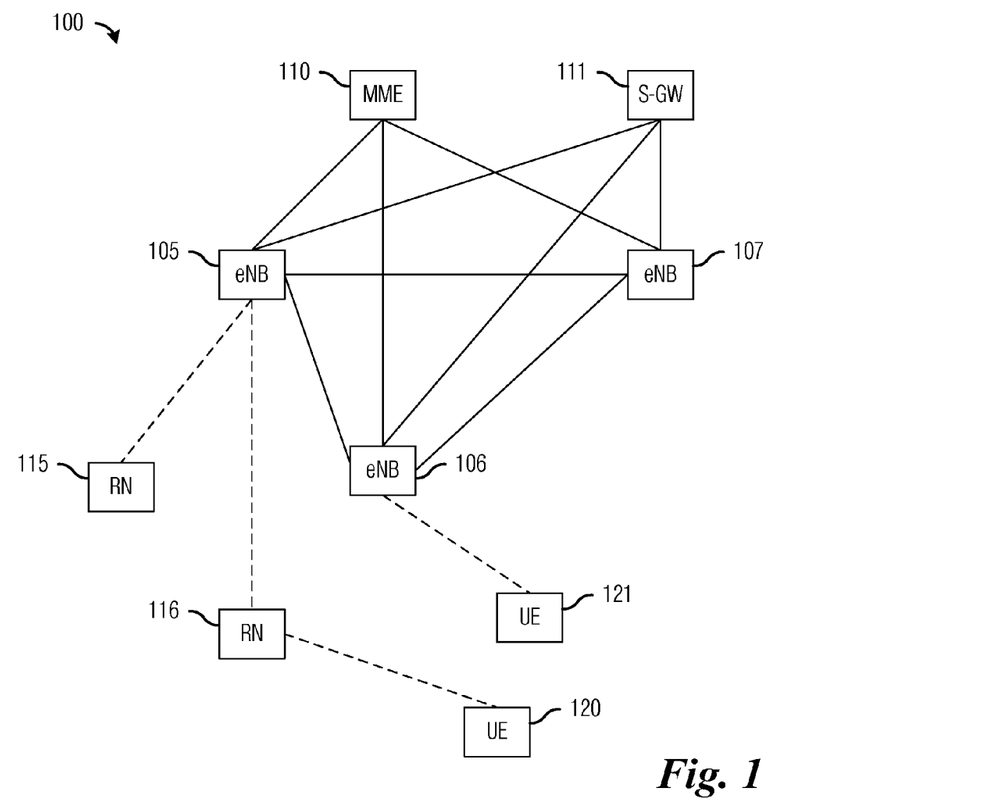
FIG. 1 is a diagram of a communications system.

FIG. 1 illustrates a communications system 100. Communications system 100 includes a number of eNBs, such as eNB 105, eNB 106, and eNB 107. The eNBs may be connected to a mobility management entity (MME) such as MME 110 for the control-plane and to a serving gateway (S-GW) such as S-GW 111 for the data-plane. The connection between an eNB and a MME or an S-GW may be a wired high-speed connection. The eNBs may also be connected to each other by wired high-speed connections. The wired high-speed connections between the eNBs and the MMEs/S-GWs may be referred to as a wired backhaul.

Communications system 100 also includes a number of RNs, such as RN 115 and RN 116. As discussed earlier, a RN may be used to improve data transfer rates, mobility, coverage, throughput, and so forth. Since a RN may be intended as a low cost alternative to an eNB, a RN may not be directly connected to the wired backhaul. Rather, a RN may be connected to the wired backhaul through a wireless connection to an eNB, wherein the eNB that is being used to wirelessly connect the RN is referred to as a donor eNB. For example, RN 115 may be connected to the wired backhaul through a wireless link provided by eNB 105. Aside from the lack of the direct link to the wired backhaul, a RN may function as another eNB in communications system 100.

Communications system 100 also includes one or more UEs, such as UE 120 and UE 121. A UE may be served by one or more eNB(s) or RN(s) over a wireless link(s), with communications to and from the UE having to flow through the eNB(s) or RN(s). To the UE receiving service, an eNB or RN may be functionally equivalent. When the UE has information to transmit, the UE must request wireless resource and cannot transmit until it has received a grant of the wireless resource. Similarly, when there is information for the UE, the information may not be sent to the UE until wireless resource has been allocated for the information. The UE may receive the wireless resource grants from an eNB or RN servicing it.

Figure 2:
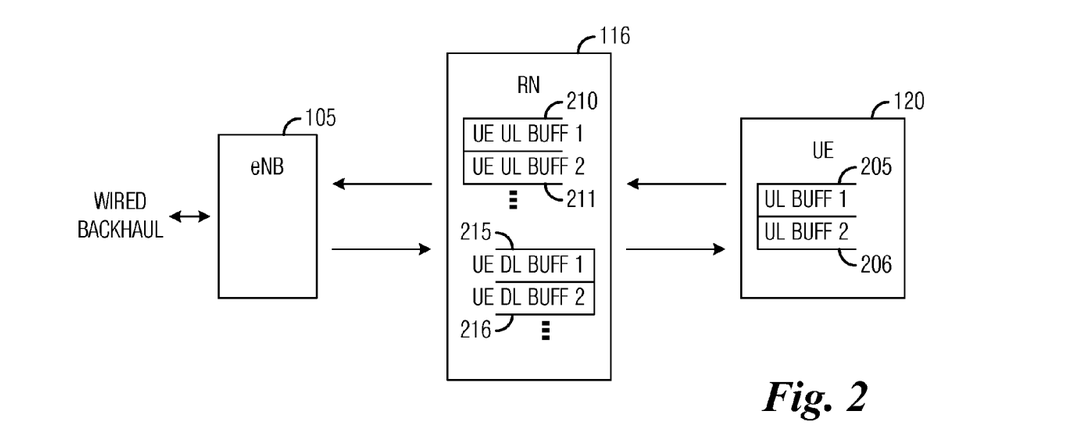
FIG. 2 is a diagram of a wireless portion of the communications system.

FIG. 2 illustrates a portion of a communications path in communications system 100. The portion of a communications path shown includes eNB 105, RN 116, and UE 120, i.e., the wireless portion of communications system 100. In general, the wireless portion of communications system 100 may have the lowest available bandwidth with the highest cost per bandwidth. Therefore, efficient use of available wireless resource is preferred.

UE 120 includes one or more UL buffers, for example, UL buffer 1 205 may be used to store UL data for a first class of traffic and UL buffer 2 206 may be used to store UL data for a second class of traffic, and so forth. Alternatively, UE 120 may have a single UL buffer that may be used to store UL data for UE 120 independent of traffic class.

RN 116 may have one or more UL buffers for each UE that it is serving, for example, UE UL buffer 1 210 may be used to store UL data for a first class of traffic from UE 120 and UE UL buffer 2 211 may be used to store UL data for a second class of traffic from UE 120. Alternatively, RN 116 may have a single UL buffer that may be used to store UL data from UE 120 independent of traffic class. UL data stored in the RN UL buffers may then be provided to eNB 105 over a RL. The wireless resource of the RL may be controlled by eNB 105.

RN 116 may have one or more DL buffers for each UE that it is serving, for example, UE DL buffer 1 215 may be used to store DL data for a first class of traffic for UE 120 and UE DL buffer 2 216 may be used to store DL data for a second class of traffic for UE 120. Alternatively, RN 116 may have a single DL buffer that may be used to store DL data for UE 120 independent of traffic class. eNB 105 may provide DL data for the UEs to RN 116 over the RL.

Figure 3:
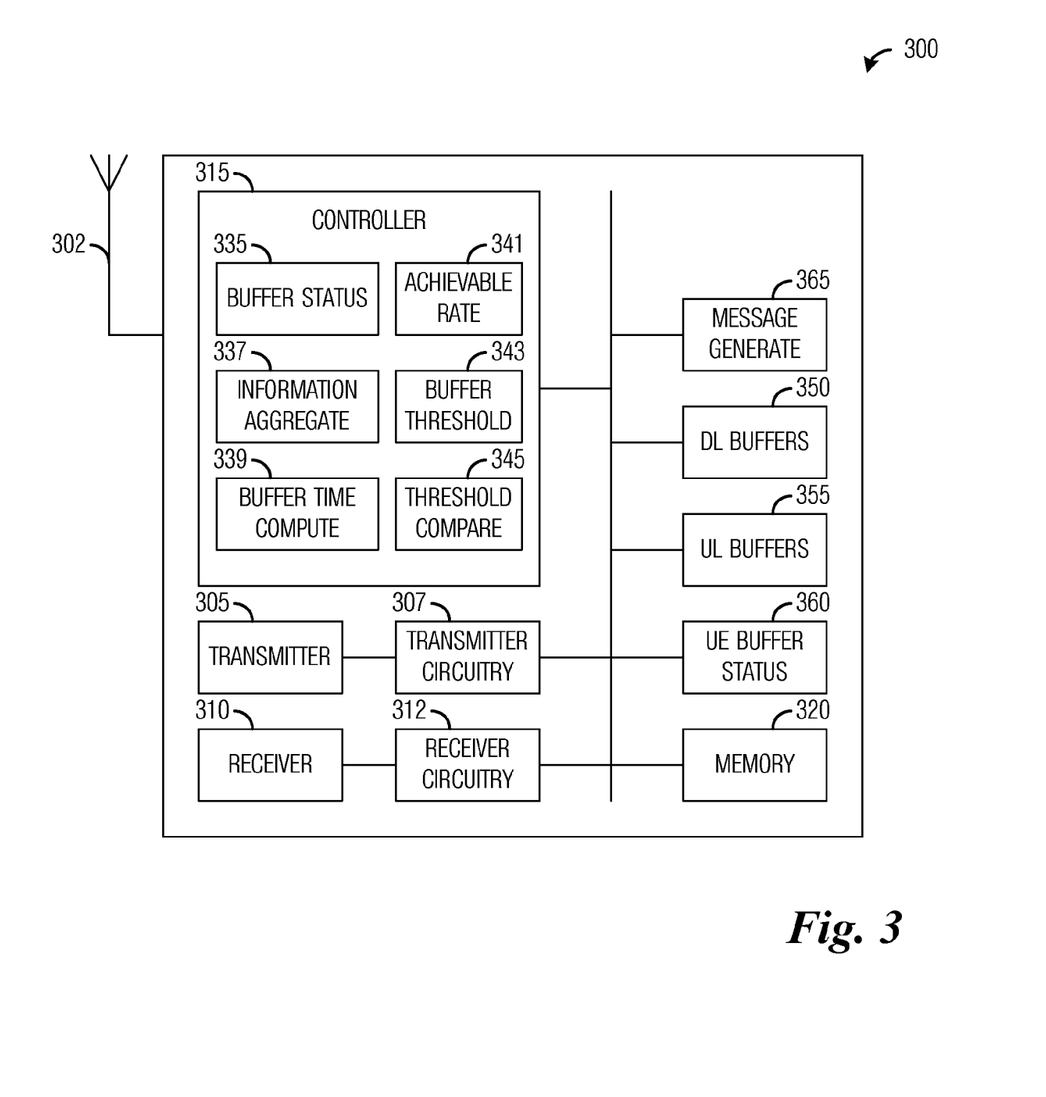
FIG. 3 is a diagram of a relay.

FIG. 3 illustrates a RN 300. RN 300 may be representative of a relay node used to relay transmissions from/to an eNB as well as to/from a UE. RN 300 may be used in communications system, as RN 116, for example.

RN 300 may have at least one antenna 302. Antenna 302 may serve as both a transmit antenna and a receive antenna. Alternatively, RN 300 may have separate transmit and receive antennas. RN 300 may have equal numbers of transmit antennas and receive antennas or RN 300 may have a different number of transmit antennas and receive antennas.

Coupled to antenna 302 may be a transmitter 305 used to transmit information over the air using antenna 302. Transmitter circuitry 307 coupled to transmitter 305 may provide signal processing for information being transmitted. Examples of signal processing provided by transmitter circuitry 307 may include filtering, amplifying, modulating, error encoding, parallel-to-serial converting, interleaving, bit puncturing, and so forth. Also coupled to antenna 302 may be a receiver 310 used to receive information detected by antenna 302. Receiver circuitry 312 coupled to receiver 310 may provide signal processing for received information. Examples of signal processing provided by receiver circuitry 312 may include filtering, amplifying, demodulating, error detecting and correcting, serial-to-parallel converting, de-interleaving, and so on.

A controller 315 may be a processing unit responsible for executing applications and programs, controlling operations of various components of RN 300, interacting with a donor eNB as well as UEs served by RN 300, and so forth. In addition to the above listed operations, controller 315 may be responsible for performing flow control of connections to RN 300 and from RN 300. RN 300 includes a memory 320 for storing applications and data.

Controller 315 includes a buffer status unit 335 that may be used to generate buffer status information based on a state of buffers, such as DL buffers 350 and UL buffers 355, used to buffer information for UEs served by RN 300. DL buffers 350 may be used to buffer information that is received from the donor eNB to be sent to the UEs and UL buffers 355 may be used to buffer information that is received from the UEs to be sent to the donor eNB. As examples, buffer status unit 335 may generate buffer status information based on an amount of information in a buffer, an amount of empty space in the buffer, a percentage full or empty of the buffer, a fill rate (also referred to as a filling rate) for the buffer, an empty rate (also referred to as a consumption rate) for the buffer, and so forth. For example, buffer status unit 335 may provide the buffer status information in a binary form, either full (or almost full) or empty (or almost empty), or a multi-bit form, either full, almost full, partly full, half full, partly empty, almost empty, empty, and so forth.

According to an embodiment, the fill rate of a buffer on an uplink may be based on a data throughput for a UE associated with the buffer. Furthermore, the fill rate of the buffer may also be based on a data throughput for RN 300 as RN 300 transmits data from the buffer to the donor eNB.

According to an embodiment, the empty rate for a buffer on a downlink may be based on a data throughput for a UE associated with the buffer. Additionally, the empty rate of the buffer may also be based on a data throughput for a donor eNB as the donor eNB transmits data to RN 300 destined for the UE.

Thresholds may be used to determine the buffer status information, for example. A buffer threshold unit 343 may be used to specify thresholds to determine a state of a buffer. For example, buffer threshold unit 343 may specify that a buffer is to be in an almost full state if it is more than 85% full or the buffer is to be in an almost empty state if it is less than 15% full. Buffer threshold unit 343 may specify multiple thresholds, depending on the nature of the buffer status information, e.g., binary form or multi-bit form. A threshold compare unit 345 may be used to compare buffer information against the thresholds specified by buffer threshold unit 343.

According to an embodiment, controller 315 may provide buffer status information in a raw form. For example, controller 315 may provide an amount of data contained in a buffer along with a fill rate or a consumption rate and allow a recipient of the buffer status information to infer a current status of the buffer and/or to project a status of the buffer at a future time.

Furthermore, controller 315 may provide buffer status information for each individual buffer (UL, DL, and/or both) or buffer status information may be aggregated together by information aggregate unit 337. Aggregating the buffer status information may help to reduce overhead by reducing am amount of buffer status information that needs to be transmitted. For example, controller 315 may provide buffer status information for all UL buffers, for all DL buffers, for UL and/or DL buffers for a particular class of traffic or type of UE, or so on.

In addition to providing buffer status information regarding a full or empty state of a buffer, controller 315 through buffer time compute unit 339 may provide buffer status information in a time value format. For example, buffer time compute unit 339 may provide an expected time that a buffer will fill or empty based on its current state and fill rate or consumption rate. The fill rate or consumption rate may be obtained from usage history for the buffer, from channel quality information, or a combination thereof.

The fill rate or consumption rate may be based on an average of transmissions made or received by UE, for example. The fill rate or consumption rate determined based on usage history may differ based on different operating conditions, such as time of day, number of communications devices present in the communications system, traffic type and load, and so forth. Therefore, different fill rates or consumption rates may be determined and a particular fill rate or consumption rate may be selected based on a current operation condition of the communications system.

The channel quality information on the downlink direction of the access link may be reported by a UE associated with the downlink buffer from measurements made by the UE. The channel quality information on the uplink direction of the access link is measured by RN 300 for a UE associated with the uplink buffer. The measurement of channel quality information by a communications device, either a UE or a donor eNB, is considered to be well known by those of ordinary skill in the art of the embodiments. Therefore, the measurement of channel quality information will not be discussed further herein.

As discussed above, the channel quality information may be used to obtain a fill rate or a consumption rate. For example, if the channel quality information indicates that the channel quality is high, it may be expected that the fill rate or consumption rate will also be high. Similarly, if the channel quality information indicates that the channel quality is low, it may be expected that the fill rate or consumption rate will also be low. An achievable rate unit 341 may be used to determine the fill rate or the consumption rate from historical information, e.g., usage history, from the channel quality information, or a combination thereof.

RN 300 also includes UE buffer status store 360 that may be used to store information regarding buffer status of UEs served by RN 300. Information for UL buffers from each UE may be stored at RN 300, which may be used to supplement buffer status information generated and reported by RN 300 to the donor eNB.

As an example, RN 300 may receive reports regarding buffer status from UEs served by RN 300. Buffer status unit 335 may make use of the buffer status of the UEs received by RN 300 and stored in UE buffer status store 360 to generate buffer status information, such as filling rate, consumption rate, or a combination thereof, which may be provided to the donor eNB.

RN 300 further includes a message generate unit 365 that may be used to generate messages to transmit buffer status information. Message generate unit 365 may generate messages to convey buffer status information to a donor eNB. Message generate unit 365 may simply generate messages containing the buffer status information. Alternatively, message generate unit 365 may only include buffer status information for buffers whose state has changed, buffers that are in danger of filling or emptying, buffers whose buffer status information has not been updated in a specified amount of time, and so forth, to reduce messaging overhead.

Message generate unit 365 may also further reduce messaging overhead by piggy backing the buffer status information on a transmission already being transmitted to the donor eNB, such as a Hybrid Automatic Repeat Request (HARQ) ACK/NACK transmission. Additionally, multiple buffer status information messages may be concatenated together to reduce a number of messages transmitted.

A detailed description of the operation of RN 300 is provided below.

Figure 4:
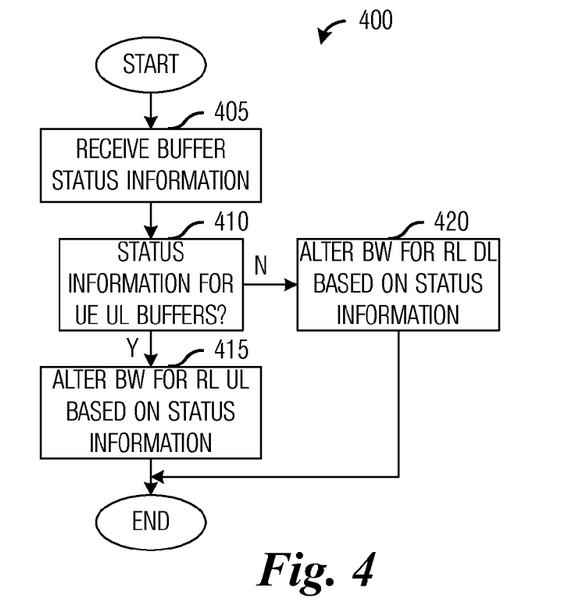
FIG. 4 is a flow diagram of donor eNB operations in relay link flow control.

FIG. 4 illustrates a flow diagram of donor eNB operations 400 in RL flow control. Donor eNB operations 400 may be indicative of operations taking place in a donor eNB, such as eNB 105, for RL flow control based on buffer status information (UL or DL or both) from a RN, such as RN 116, wirelessly coupled to the donor eNB. The donor eNB donates a portion of its available wireless resource to provide a RL (UL or DL or both) to the RN, to simulate a wired connection from the RN to the wired backhaul.

Donor eNB operations 400 may occur periodically, at specified intervals, for example. Alternatively, donor eNB operations 400 may occur when the donor eNB receives a transmission of buffer status information, which may occur periodically at specified intervals or when the RN detects that it has buffers that are full (or almost full) or empty (or almost empty).

To efficiently use wireless resources, the donor eNB may adjust its wireless resource allocation to the RL based on buffer status information provided by the RN. If the donor eNB allocates more DL wireless resources to the RL than needed, then the DL wireless resources may be wasted as well as potentially keeping DL buffers at the RN filled (or about filled) level, and potentially resulting in data loss if UEs being served by the RN cannot consume (i.e., transmit to the intended UE) the DL data at a sufficient rate. Similarly, if too little UL wireless resources are allocated to the RL, then the UL buffers at the RN may be kept in the filled (or about filled) level, which may require the RN to stop scheduling UL transmissions from a UE or UEs and negatively impacting the RN's ability to fully exploit multi-user diversity scheduling. The donor eNB may adjust its wireless resource allocation to the RL dynamically through scheduling. Alternatively, the donor eNB may adjust its wireless resource allocation to the RL semi-statically.

Donor eNB operations 400 may begin with the donor eNB receiving buffer status information from the RN (block 405). The buffer status information from the RN may include DL buffer status information, UL buffer status information, or both DL buffer status information and UL buffer status information. The buffer status information may provide information about the status of each buffer at the RN. For example, if the RN includes a buffer for each class of traffic for each UE that it is serving, then the RN may provide a buffer status for each buffer.

Alternatively, the RN may aggregate the buffer status information for each UE that it is servicing (independent of traffic class) and provide the aggregated status information per UE to the donor eNB. Alternatively, the RN may aggregate the buffer status information for all of the UEs that it is servicing based on traffic class and provide the aggregated status information per traffic class to the donor eNB. Alternatively, the RN may aggregate the buffer status information for all of the UEs that it is servicing based on UL/DL and provide the aggregated status information per link direction to the donor eNB.

According to an embodiment, in order to efficiently utilize wireless resources, i.e., reduce overhead, the RN may provide buffer status information for buffers only if they exceed a specified threshold since providing buffer status information for buffers that are not full or empty may needlessly waste wireless resources on information that may not be used. For example, the RN will transmit buffer status information for a buffer if the buffer is filled (or near filled) or empty (or near empty). If the buffer is neither filled nor empty, then the RN may not provide its buffer status information to the donor eNB.

In an alternative embodiment, rather than binary operation (filled/empty), multiple buffer status thresholds may be used to convey additional information to the donor eNB. Multiple bits of information may be used to indicate the status of the buffer. For example, two-bits of information may be used to indicate the status of the buffer, with "00" indicating that the buffer is empty, "01" indicating that the buffer is almost empty (e.g., less than 15 percent filled), "10" indicating that the buffer is almost filled (e.g., more than 85 percent filled), and "11" indicating that the buffer is filled. The number of bits used to convey buffer status information may be based on factors such as desired accuracy, available wireless resources for conveying buffer status information to the eNB, number of buffers in use, and so forth. Therefore, the use of two-bits of buffer status information, and filled, 85% filled, 15% filled, and empty are merely for illustrative purposes and should not be construed as being limiting to either the scope or spirit of the embodiments.

In an alternative embodiment, rather than providing information about the amount of information in a buffer, the RN may provide an expected time to buffer starvation for a buffer to the donor eNB. The expected time to buffer starvation for a buffer may be defined as an amount of time when the data stored in the buffer is expected to be consumed, i.e. to be transmitted. The expected time to buffer starvation may be a function of the amount of data stored in the buffer and an expected consumption rate. For example, if a DL buffer has 500 kBytes of data stored and a UE has an expected consumption rate of 100 kBytes per millisecond, then the expected time to buffer starvation for this buffer/UE pair is 500 kBytes/100 kBytes/millisecond or 5 milliseconds.

The expected consumption rate of a UE may be obtained from recent data throughput history for the UE or a channel quality information reported or measured from the UE. As an example, a channel with a high channel quality is expected to have a higher consumption rate than a channel with a low channel quality. Potentially, historical information of consumption rates as a function of channel quality information may be used to determine consumption rate from channel quality information. Reporting the expected time to buffer starvation may be able to provide a sense of urgency or time scale for the donor eNB to allocate RL resources to re-fill the buffer for the UE before it becomes empty.

In yet an alternative embodiment, rather than providing information about the amount of information in a buffer, the RN may provide an expected time to buffer congestion for a buffer to the donor eNB. The expected time to buffer congestion for a buffer may be defined as an amount of time when the unoccupied portion of the buffer is expected to be consumed, i.e. to be filled up with data. The expected time to buffer congestion may be a function of the amount of unoccupied portion of the buffer and the expected consumption rate (or fill rate). As with the consumption rate, the fill rate may be obtained from historical data or channel quality information. Reporting the expected time to buffer congestion may be able to provide a sense of urgency or time scale for the donor eNB to allocate RL resources to empty the RN buffer for the UE before it becomes congested.

In yet another alternative embodiment, instead of performing computation of the expected time to buffer starvation (or the expected time to buffer congestion) information by itself, the RN may transmit an amount of data stored in a buffer (or an amount of unoccupied portion in a buffer) and an expected consumption rate or fill rate to the donor eNB and let the donor eNB compute the expected time to buffer starvation (or the expected time to buffer congestion) itself. Additionally, if an expected consumption rate or fill rate for a buffer has not changed, then the RN may simply transmit the amount of data stored in the buffer (or the amount of unoccupied portion in a buffer) and the donor eNB may use the expected consumption rate previously transmitted by the RN.

A motivation for providing the donor eNB with the information of the expected consumption rate or fill rate for a UE over the access link, explicitly or implicitly (e.g. by reporting the expected time information) may be to enable the donor eNB to regulate the rate of data flow over the RL to better match the potentially achievable rate of data flow over the access link for the UE. For that reason, it may be more suitable for an RN to report the expected time to buffer starvation for DL operation and it may be more suitable for an RN to report the expected time to buffer congestion for UL operation.

In general, in any communications network, a technique of providing the information pertaining to the achievable rate for an end user that is at the edge or downstream of a communication network (in addition to the buffer level information at the edge or downstream node of the communication network for the end user) may help the network nodes upstream to the end user that otherwise does not have such information to regulate the rate of data flow between various network nodes to better match the achievable rate for the end user. For example, consider a first group of wireless transceiver nodes formed in a first wireless Ad-hoc network with one wireless transceiver node of the first group functioning as a first wireless gateway to organize the communications among the member nodes of the first group, and as a gateway to help them to communicate with a second wireless gateway of a second wireless Ad-hoc network or to communicate with an access point which is further connected with a wired network.

In the situation as described, the second wireless gateway or the access point normally does not have the knowledge of the topology nor the channel conditions between the member nodes of the first group, thereby it does not have the knowledge of the achievable rate for delivering data to a particular member node of the first group, even if it is about to deliver data to this particular member node of the first group via the first wireless gateway. However, the first wireless gateway may have this knowledge as it is in charge of the first wireless Ad-hoc network.

Since the topology of the first wireless Ad-hoc network may change over time depending on the busy/non-busy status of each member node as well as depending on the radio channel conditions between the various member nodes, the achievable rate for delivering data to a particular member node of the first group may change as the topology changes even if there is no mobility among the member nodes of the first group. Therefore, it may be advantageous for the first wireless gateway to provide the information of the achievable rate for delivering data to a particular member node within the first wireless Ad-hoc network to the second wireless gateway or to the access point. The achievable rate for delivering data may be provided in addition to buffer level information at the first wireless gateway for this particular member node of the first group.

The information of the achievable rate may be provided explicitly or implicitly, e.g., by translating the rate information and the buffer level information into time information. The information of the achievable rate may be provided regularly or based on events, such as when the network topology is changed or when the channel conditions between network nodes change. The second wireless gateway or the access point can use the information to regulate the rate of data flow to or from the first wireless gateway for data that is intended for the particular member node of the first group to better match with the achievable rate for delivering data to the particular member node of the first group within the first wireless Ad-hoc network.

Furthermore, within the first wireless Ad-hoc network, the data intended for a particular member node may be channeled through a plurality of member nodes before reaching the particular member node. Therefore, it may be advantageous for an intermediate node along a data-delivery path to provide its upstream node with the information of the achievable rate for deliver data to its downstream node in addition to the buffer level information at the intermediate node for the downstream node, so that the upstream node can regulate the rate of data flow to the intermediate node that is intended for the downstream node to better match the achievable rate for delivering data from the intermediate node to the downstream node.

The same inventive techniques described above may be applied to a communication network with interconnections based on wired media, radio wave, acoustic wave (e.g. for underwater communications), infrared, visible light, or a combination thereof. Therefore, the discussion of wireless communications should not be construed as being limiting to either the scope or the spirit of the embodiments.

In another alternative embodiment, the RN may also further indicate the UL buffer status reported from each UE (in addition to its own UL buffers for each of the UEs) as well as potential UL throughput that may be achievable over the UL access links between the RN and the UEs. The additional information may allow the donor eNB to more effectively and efficiently manage the UL RL. For example, the division of wireless resources between the RL and the access link may be reconfigured using the additional information.

In an additional alternative embodiment, the RN may also indicate its UL data buffer status for one or more individual UEs in order to give these UEs preferential allocation from the donor eNB on the RL.

Once it receives buffer status information from the RN, the donor eNB may alter the RL based on the buffer status information. For example, the donor eNB may determine if the buffer status information is for the UL buffers (block 410) and alter the wireless resource allocation for the UL of the RL based on the UL buffer status information (block 415). For example, if the UL buffer status information indicates that the UL buffers are full (or almost full), then the donor eNB may increase the wireless resources allocated to the UL RL to allow the RN to transmit more UL data to the donor eNB. Increasing the wireless resources allocation may help to decrease the amount of data being stored in the UL buffers at the RN. While, if the UL buffer status information indicates that the UL buffers are empty (or almost empty), then the donor eNB may decrease the wireless resources allocated to the UL RL to allow the RN to transmit less UL data to the donor eNB. Decreasing the wireless resources allocation may free up the donor eNB's wireless resources for other use, such as increasing DL RL wireless resources allocation, increasing wireless resources for UEs being served directly by the donor eNB, and so forth.

While, if the buffer status information is for the DL buffers (block 410), then the donor eNB may alter the wireless resource allocation for the DL of the RL based on the DL buffer status information (block 420). For example, if the DL buffer status information indicates that the DL buffers are full (or almost full), then the donor eNB may decrease the wireless resources allocated to the DL RL to prevent data loss at the RN as the DL buffers fill. The donor eNB may decrease the wireless resources allocation of the DL RL across the board or the donor eNB may select the UEs of the DL buffers that are full and not forward DL data for only the selected UEs, while continuing to transmit DL data for UEs with DL buffers that are not full (or even increasing the transmissions of those UEs).

If the DL buffer status information indicates that the DL buffers are empty (or almost empty), then the donor eNB may increase the wireless resources allocation of the DL RL or the donor eNB may select the UEs having the empty DL buffers and increase the transmissions of the selected UEs. Alternatively, the donor eNB may increase the priority of the transmissions of the selected UEs, which may allow the transmissions of the selected UEs greater access to the DL RL. In an embodiment where the RN DL buffer statuses for the selected UEs are reported with the content of expected times to buffer starvation or the expected consumption rates are also provided to the donor eNB, the donor eNB can optimize the transmission rates to the selected UEs in order to re-fill the RN DL buffers for these UEs.

The donor eNB may react to the buffer status information (UL or DL) in a binary manner, such as described above, or the donor eNB may map the buffer status information into a probability value for a certain reaction. Then the donor eNB generates a random value between 0 and 1, compare it with the probability value, and react accordingly. For example, if the buffer status information reports multiple bits of buffer status information per buffer, then the donor eNB may be able to generate a probability value using the multiple bits of buffer status information. For instance, if the RN reports the buffer status information for two DL buffers, with a first buffer being reported as closer to being at a full level than a second buffer, the donor eNB may assign a higher probability to decrease the rate for DL data transmissions to the first buffer than the probability assigned to decrease the rate for the second buffer.

With the donor eNB receiving the buffer status information and making any adjustments to the RL based on the buffer status information, donor eNB operations 400 is complete and may then terminate.

Figure 5:
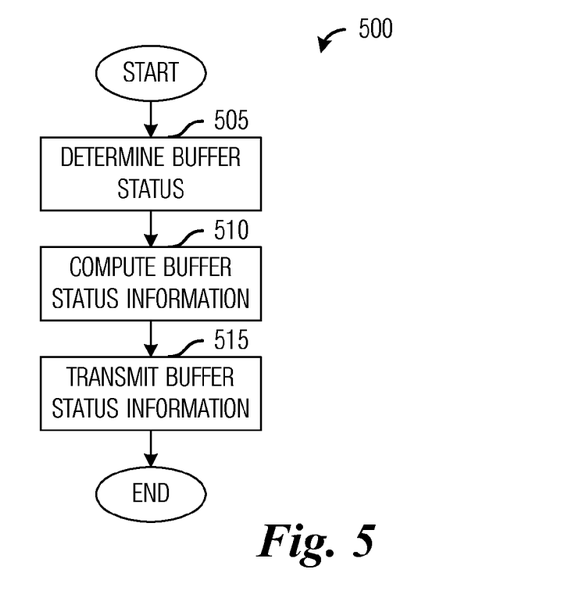
FIG. 5 is a flow diagram of relay node operations in relay link flow control.

FIG. 5 illustrates a flow diagram of RN operations 500 in RL flow control. RN operations 500 may be indicative of operations taking place in a RN, such as RN 116, for RL flow control based on buffer status information (both UL and DL) at a donor eNB, such as eNB 105, wherein the eNB 105 and the RN 116 are wireless coupled. The donor eNB donates a portion of its available wireless resource to provide a RL (both UL and DL) to the RN, to simulate a wired connection from the RN to the wired backhaul.

RN operations 500 may occur periodically, at specified intervals, for example. Alternatively, RN operations 500 may occur when the RN detects that it has buffers that are full (or almost full), empty (or almost empty), or at a specified buffer status.

RN operations 500 may begin with the RN determining the buffer status of its buffers (block 505). For example, the RN may determine the amount of data stored in each of its DL and UL buffers. Alternatively, the RN may aggregate its buffers based on UE, traffic class, link direction (DL or UL), or a combination thereof.

Once it has determined the buffer status, the RN may compute buffer status information from the buffer status (block 510). For example, from the amount of data stored in a buffer, the RN may compute a percentage of the buffer that is full or empty, an indication of the amount of data stored in the buffer, an expected time to buffer starvation or to buffer congestion for the buffer, or so on.

The RN may then transmit the buffer status information to the donor eNB (block 515). The RN may directly transmit the buffer status information to the donor eNB using a Media Access Control (MAC) control Protocol Data Unit (PDU) or a Radio Resource Control (RRC) message, for example. Alternatively, the RN may transmit the buffer status information to the donor eNB if the buffer status information exceeds a threshold. For example, the RN may transmit the buffer status information to the donor eNB if the buffer status information indicates that the buffer is full or empty (or almost full or almost empty), if the buffer will be empty (consumed) within a specified amount of time, or so forth. If the buffer status information indicates that the buffer is not full or empty, or will not be empty within a specified amount of time, and so on, then the RN may not transmit the buffer status information to the donor eNB.

In an alternative embodiment, rather than directly transmitting the buffer status information to the donor eNB in a separate transmission, the RN may piggy back the buffer status information on a transmission already being transmitted to the donor eNB. For example, the buffer status information may be piggy backed onto an ACK/NACK transmission that is being sent to the donor eNB from the RN for received DL data (as part of a Hybrid Automatic Repeat Request (HARQ) operation).

In another alternative embodiment, to reduce the number of transmissions to the donor eNB, the RN may concatenate the buffer status information of multiple UEs into a single message and transmit the single message to the donor eNB using a Media Access Control (MAC) control Protocol Data Unit (PDU) or a Radio Resource Control (RRC) message, for example. Alternatively, a Scheduling Request Indicator (SRI) message may be used to convey buffer status information to the eNB. For example, the SRI message may be used to request additional or less wireless resource in the RL for UL, or DL, or for both UL and DL.

Alternatively, an LTE Release 8 Buffer Status Report (BSR) message may be used to transmit the concatenated buffer status information. The use of the BSR message may include a reinterpretation of the information contained in the BSR message. For example, a BSR message contains information for four Logical Channel Groups (LCG). The LCGs may be modified or reinterpreted to convey buffer status information for a number of different groups of UEs, a number of different groups of traffic classes, and so forth. The BSR message may be used to convey buffer status information for UL, or DL, or both UL and DL.

Exemplary message formats may include:
- a bitmap that may include normal level and also suitable for conveying consumption time, the bitmap pattern may be known at both RN and eNB;
- N×(UE_ID+1-bit full/empty) with implicit indication of normal buffer level, where N is the number of UEs;
- N×(UE_ID+M-bit expected time) with implicit indication of normal expected times, where N is the number of UEs;
- N×(UE_ID+K-bit amount of data in buffer+L-bit UE consumption rate), where N is the number of UEs, data in buffer is the amount of data in the buffer for the UE, and consumption rate is the UE's consumption rate.

In yet another alternative embodiment, a combination of buffer status information piggy backing and concatenation of buffer status information for multiple UEs into a message may be used. For example, it may be possible to piggy back buffer status information for UE who have just received DL data transmissions into an ACK/NACK response, while for UEs who have not received a DL data transmission, their concatenated buffer status information may be placed into a message and transmitted to the donor eNB.

With the RN transmitting the buffer status information to the donor eNB, RN operations 500 may then terminate.

Advantageous features of embodiments of the invention may include: A method for relay operation, the method comprising: determining a buffer status of a data buffer; computing a buffer status information based on the buffer status; and transmitting the buffer status information to a donor device. The method could further include, wherein determining a buffer status comprises measuring an amount of data buffered in the data buffer. The method could further include, wherein determining a buffer status comprises measuring an amount of unoccupied portion in the data buffer. The method could further include, wherein computing a buffer status information comprises computing a percentage full of the data buffer. The method could further include, wherein computing a buffer status information comprises computing a consumption time of the data buffer. The method could further include, wherein the consumption time of the data buffer comprises an amount of data buffered in the data buffer divided by a consumption rate for the data buffer. The method could further include, wherein the consumption rate is determined from a channel quality indicator that is reported by a radio device associated with the data buffer. The method could further include, wherein the consumption rate is determined from a history of a data throughput for a radio device associated with the data buffer. The method could further include, wherein the consumption time of the data buffer comprises an amount of unoccupied portion of the data buffer divided by a consumption rate for the data buffer. The method could further include, wherein the consumption rate is determined from a channel quality indicator that is reported by a radio device associated with the data buffer. The method could further include, wherein the consumption rate is determined from a history of data throughput for a radio device associated with the data buffer. The method could further include, wherein there are multiple data buffers, and wherein determining the buffer status comprises aggregating a buffer status for at least two data buffers. The method could further include, wherein the at least two data buffers are associated with a single radio device. The method could further include, wherein the at least two data buffers are associated with a single traffic class. The method could further include, wherein transmitting the buffer status information comprises piggy backing the buffer status information onto a message. The method could further include, wherein the message comprises an ACK/NACK transmission from a Hybrid Automatic Repeat Request operation. The method could further include, wherein transmitting the buffer status information comprises: concatenating more than one buffer status information onto a message; and transmitting the concatenated buffer status information message to the donor device. The method could further include, wherein more than one buffer status information includes at least one buffer status information for a first radio device and at least one buffer status information for a second radio device. The method could further include, wherein more than one buffer status information includes at least one buffer status information for a first traffic class and at least one buffer status information for a second traffic class. The method could further include, wherein more than one buffer status information includes at least one buffer status information for a downlink communication direction and at least one buffer status information for an uplink communication direction.

Advantageous features of embodiments of the invention may include: A method for donor device operation wirelessly coupled to a relay device, the method comprising receiving buffer status information, wherein the buffer status information comprises a buffer status of at least one of the uplink (UL) and downlink (DL) buffers at the relay device. The method could further include, further comprising causing the donor device to adjust a link between the donor device and the relay device based on the received buffer status information. The method could further include, wherein causing the donor device to adjust a link comprises: increasing a wireless resource allocation for a UL portion of the link in response to determining that the UL buffer is full; and altering a wireless resource usage for a DL portion of the link in response to determining the DL buffer is full. The method could further include, wherein causing the donor device to adjust a link further comprises decreasing the wireless resource allocation for the UL portion of the link in response to determining that the UL buffer is empty. The method could further include, wherein there are multiple DL buffers, and wherein altering a wireless resource usage comprises suspending DL transmissions to DL buffers that are full. The method could further include, wherein suspending DL transmissions comprises decreasing a priority of DL transmissions to DL buffers that are full. The method could further include, wherein altering a wireless resource usage further comprises increasing DL transmissions to DL buffers that are not full. The method could further include, wherein the increasing DL transmissions comprises increasing a priority of the DL transmissions to DL buffers that are not full. The method could further include, wherein receiving buffer status information comprises receiving the buffer status information piggy backed on a received message. The method could further include, wherein the received message comprises an ACK/NACK transmission from a Hybrid Automatic Repeat Request operation. The method could further include, wherein receiving buffer status information comprises receiving a buffer status report message. The method could further include, wherein there are multiple buffers, and wherein receiving a buffer status report message comprises receiving concatenated buffer status information for the multiple buffers on the received buffer status report message. The method could further include, wherein receiving buffer status information comprises receiving a service request indication message. The method could further include, wherein the buffer status information reports a multi-bit value indicating the status of the buffer, and wherein causing the donor device to adjust a link comprises the donor device to adjust the link based on a degree of buffer fullness.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a relay in a communication system, the method comprising:

determining a buffer status of a buffer associated with a communications channel, the communications channel allocated from network resources controlled by a communications controller;
estimating a future consumption rate for the buffer in accordance with a historic throughput rate for the communications channel, wherein the future consumption rate indicates a predicted rate at which data is projected to be written into the buffer during a future time period;
determining buffer status information in accordance with the buffer status and the consumption rate for the buffer; and
transmitting the buffer status information to the communications controller, wherein the buffer status information is communicated in a buffer status report message, and wherein the buffer status report message includes concatenated buffer status information for multiple buffers in the relay.

2. The method of claim 1, wherein determining the buffer status comprises measuring an amount of data presently stored in the buffer, measuring an additional storage capacity of the buffer, or a combination thereof.

3. The method of claim 1, wherein the buffer status information comprises a consumption time of the buffer, wherein the consumption time of the buffer is an amount of data buffered in the buffer divided by the future consumption rate for the buffer.

4. The method of claim 3, wherein estimating the future consumption rate further includes estimating the future consumption rate in accordance with a channel quality associated with the communications channel.

5. The method of claim 1, wherein each of the multiple buffers are associated with a common communications device, a common traffic class, a common transmission direction, or a combination thereof.

6. The method of claim 1, wherein the buffer status information is piggy backed onto a message sent to the communications controller.

7. The method of claim 1, wherein transmitting the buffer status information comprises:
concatenating more than one buffer status information onto a message; and
transmitting the message to the communications controller.

8. The method of claim 7, wherein the more than one buffer status information comprises at least one buffer status information for a first communications device and at least one buffer status information for a second communications device, at least one buffer status information for a first traffic class and at least one buffer status information for a second traffic class, at least one buffer status information for a first communications direction and at least one buffer status information for a second communications direction, or a combination thereof.

9. The method of claim 1, further comprising receiving a buffer status report related to a buffer for data to be transmitted on an access communications channel between the relay and a communications device, wherein the access communications channel is allocated from network resources controlled by the relay, and wherein the buffer status information is further determined in accordance with the buffer status report.

10. A method for controller operation, the method comprising:
receiving, from a relay device, buffer status information for a buffer at the relay device, wherein the buffer status information specifies a buffer status and a future consumption rate of the buffer, the future consumption rate indicating a predicted rate at which data is projected to be written into the buffer during a future period of time, wherein the buffer status information is communicated in a buffer status report message, and wherein the buffer status report message includes concatenated buffer status information for multiple buffers; and
adjusting a network resources allocation for a communications channel associated with the buffer in accordance with the buffer status information, wherein the communications channel is allocated from network resources controlled by the controller.

11. The method of claim 10, wherein adjusting a network resource allocation comprises:
increasing the network resources allocation for an uplink portion of the communications channel in response to determining that the buffer will be filled or emptied within a threshold period of time.

12. The method of claim 10, wherein the buffer status information is piggy backed on a message received from the relay device.

13. The method of claim 10, wherein the buffer status information is communicated in a service request indication message.

14. The method of claim 10, wherein the buffer status information reports a multi-bit value indicating a degree of buffer fullness of the buffer, and wherein adjusting a network resource allocation comprises adjusting the network resource allocation in accordance with the degree of buffer fullness.

15. A relay comprising:
a receiver coupled to a receive antenna, the receiver configured to receive signals detected by the receive antenna;
a transmitter coupled to a transmit antenna, the transmitter configured to transmit signals with the transmit antenna;
a buffer coupled to the receiver and to the transmitter, the buffer configured to store data for a communications channels allocated from network resources controlled by a communications controller; and
a controller coupled to the buffer, to the transmitter, and to the receiver, the controller configured to determine a buffer status for the buffer, to estimate a future consumption rate for the buffer in accordance with a historic throughput rate for the communications channel, the future consumption rate indicating a predicted rate at which data is projected to be written into the buffer during a future period of time, and to communicate a buffer status report message to the communications controller, the buffer status report message including buffer status information specifying the buffer status and the future consumption rate, wherein the buffer status report message further includes concatenated buffer status information for multiple buffers in the relay.

16. The relay of claim 15, wherein the communications channel is an uplink communications channel that extends at least between the relay and a user equipment (UE).

17. The relay of claim 15, wherein the communications channel is a downlink communications channel that extends at least between the relay and the communications controller.

18. The relay of claim 15, wherein the historic throughput rate for the communications channel indicates a rate at which data was communicated over the communications channels during a previous period of time.

* * * * *